US 9,616,807 B2

(12) United States Patent
Miura et al.

(10) Patent No.: US 9,616,807 B2
(45) Date of Patent: Apr. 11, 2017

(54) VEHICLE FUNCTIONAL COMPONENT

(75) Inventors: Takayuki Miura, Habikino (JP);
Yoshihiro Kamiike, Habikino (JP);
Yuichi Ohga, Moriya (JP)

(73) Assignees: FU-SE VACUUM FORMING CO., LTD., Osaka (JP); KOHKI CO., LTD., Ibaraki (JP)

(*) Notice: Subject to any disclaimer, the term of this patent is extended or adjusted under 35 U.S.C. 154(b) by 27 days.

(21) Appl. No.: 14/130,394

(22) PCT Filed: Aug. 8, 2012

(86) PCT No.: PCT/JP2012/070212
§ 371 (c)(1),
(2), (4) Date: Feb. 28, 2014

(87) PCT Pub. No.: WO2013/022027
PCT Pub. Date: Feb. 14, 2013

(65) Prior Publication Data
US 2014/0204599 A1  Jul. 24, 2014

(30) Foreign Application Priority Data

Aug. 8, 2011 (JP) ................................. 2011-173477

(51) Int. Cl.
*B60Q 1/00* (2006.01)
*B60Q 1/26* (2006.01)
(Continued)

(52) U.S. Cl.
CPC ......... *B60Q 1/2661* (2013.01); *B60Q 1/2665* (2013.01); *B60Q 1/2669* (2013.01);
(Continued)

(58) Field of Classification Search
CPC .............................. B60Q 1/323; B60Q 1/2669
(Continued)

(56) References Cited

U.S. PATENT DOCUMENTS 5,083,251 A * 1/1992 Parker .................... F21V 17/04
362/255
6,305,830 B1 * 10/2001 Zwick et al. ................. 362/520
(Continued)

FOREIGN PATENT DOCUMENTS

| JP | 2000-318515 | 11/2000 |
| JP | 3100024 U | 4/2004 |
| JP | 3113521 | 9/2005 |
| JP | 2005-282205 | 10/2005 |
| JP | 2007-83740 | 4/2007 |
| JP | 2008-202286 | 9/2008 |

OTHER PUBLICATIONS

International Search Report issued Oct. 30, 2012, in PCT/JP12/070212 filed Aug. 8, 2012.

*Primary Examiner* — Bryon T Gyllstrom
(74) *Attorney, Agent, or Firm* — Cheng Law Group, PLLC

(57) ABSTRACT

A vehicle component includes a molded cover molded into a shape of a surface of a part attached to a vehicle and a surface-emitting device bonded or fitted and fixed along a back face of the molded cover. The molded cover is vacuum formed by solid decorative molding of a translucent resin molded member with a translucent film, and light from the surface-emitting device is transmitted through the molded cover and emerges in a predetermined light-emitting area which is a part of a surface of the vehicle component. The vehicle component obtains a light-emitting function with a relatively simple structure and in a relatively compact form with a design not impaired and excellent in beauty and appearance.

12 Claims, 14 Drawing Sheets

(51) Int. Cl.

| | |
|---|---|
| *B60R 13/04* | (2006.01) |
| *F21S 8/10* | (2006.01) |
| *E05B 85/16* | (2014.01) |
| *E05B 17/10* | (2006.01) |
| *B60Q 1/34* | (2006.01) |
| *B60Q 1/46* | (2006.01) |
| *B60Q 1/50* | (2006.01) |

(52) U.S. Cl.
CPC ............... *B60Q 1/34* (2013.01); *B60Q 1/46* (2013.01); *B60Q 1/50* (2013.01); *B60R 13/04* (2013.01); *E05B 17/10* (2013.01); *E05B 85/16* (2013.01); *F21S 48/215* (2013.01); *F21S 48/2243* (2013.01); *F21S 48/2268* (2013.01)

(58) Field of Classification Search
USPC .......................................................... 362/501
See application file for complete search history.

(56) References Cited

U.S. PATENT DOCUMENTS

| | | | |
|---|---|---|---|
| 6,392,559 B1* | 5/2002 | Sharpe, Jr. ................. 340/12.22 |
| 7,400,232 B2* | 7/2008 | Reichling et al. ....... 340/426.36 |
| 2003/0031025 A1* | 2/2003 | Huizenga ..................... 362/501 |
| 2003/0095416 A1* | 5/2003 | Huizenga ..................... 362/501 |
| 2005/0047162 A1* | 3/2005 | Baek ............................ 362/501 |
| 2005/0231364 A1 | 10/2005 | Nitawaki et al. |
| 2006/0282987 A1* | 12/2006 | Shih et al. ..................... 16/412 |
| 2007/0008736 A1* | 1/2007 | Gasquet ........................ 362/511 |
| 2007/0216172 A1* | 9/2007 | Chang ........................... 292/336 |
| 2007/0258258 A1* | 11/2007 | Wang ............................ 362/501 |
| 2007/0263401 A1* | 11/2007 | Shi ................................ 362/501 |
| 2008/0170405 A1* | 7/2008 | Kamiya et al. .............. 362/495 |
| 2009/0147528 A1* | 6/2009 | Wang ............................ 362/501 |
| 2012/0106182 A1* | 5/2012 | Minter et al. ................. 362/501 |

* cited by examiner

Fig.7
(a)
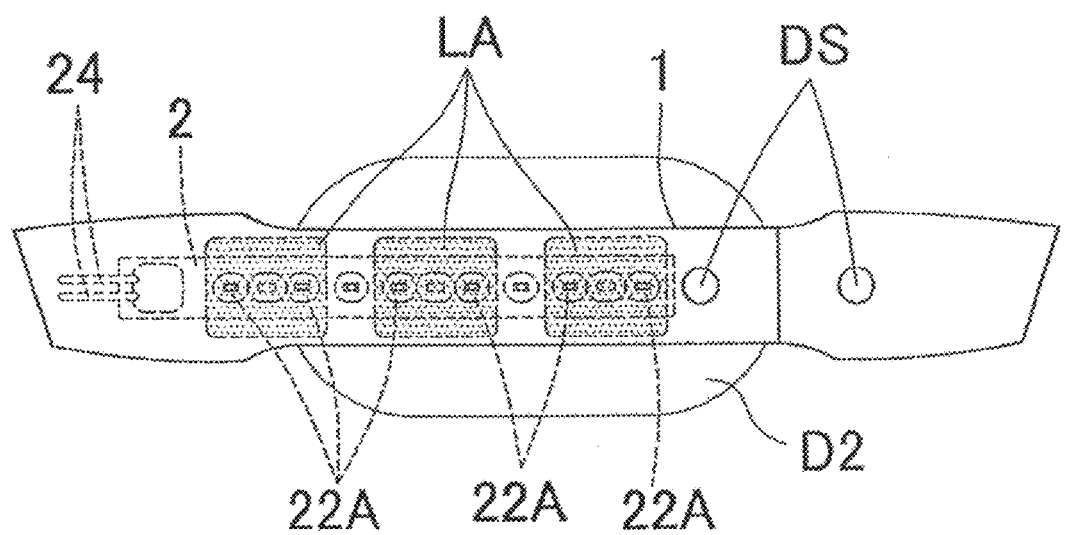
(b)
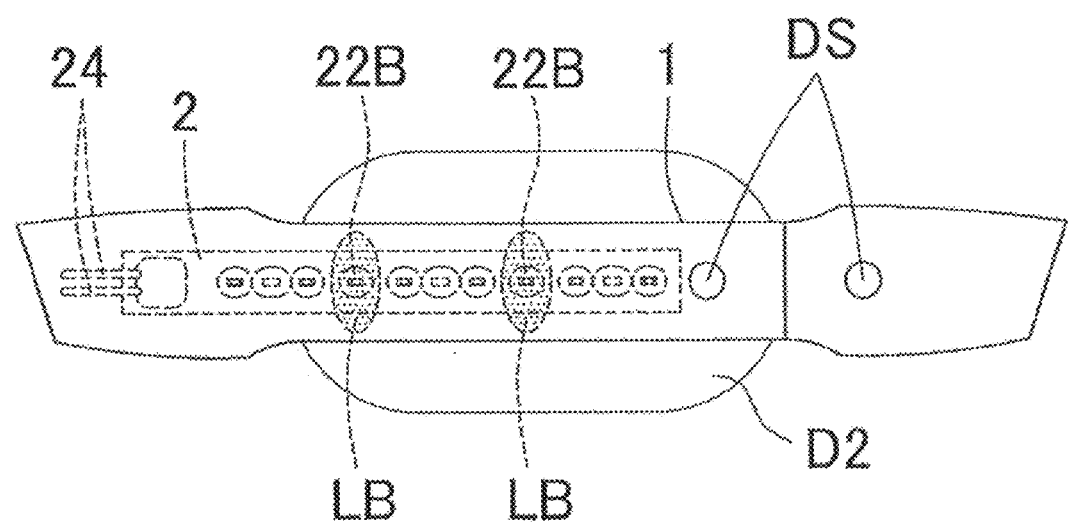

Fig.13
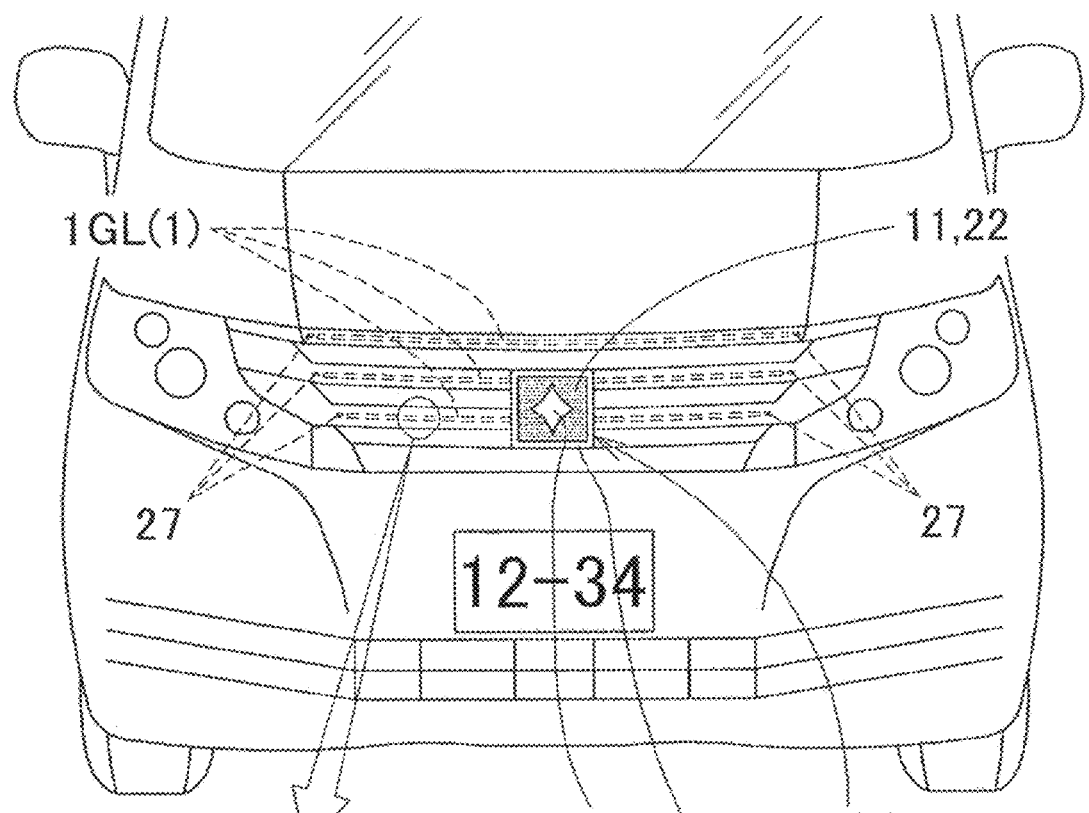
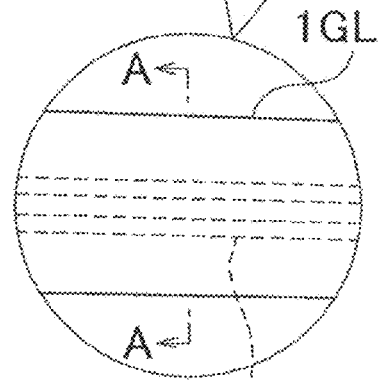
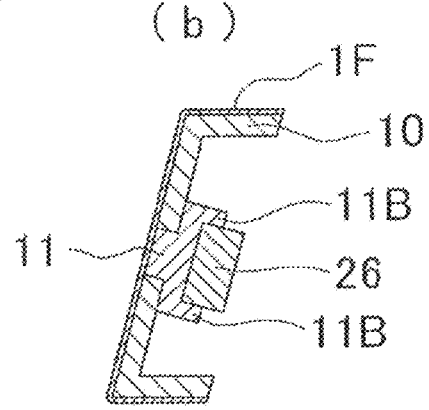

VEHICLE FUNCTIONAL COMPONENT

TECHNICAL FIELD

The present invention relates to a vehicle functional component, such as an automobile door mirror, a mirror cover, a rearview mirror for a motorcycle, an automobile door handle, a mounting frame for a door handle, an oil filler cover, an exposed oil filler cap, a grille, side pillars (an A-pillar, a B-pillar, and a C-pillar), a body side molding, a rear garnish, an emblem, a plate frame, an antenna, a fender, an indicator light cover, various meters, and various control levers, which exerts a function when it is attached to a main body or a part of the main body of an automobile or a motorcycle or a vehicle functional component forming an exterior part of an automobile or a motorcycle, and especially one having a light-emitting function inside thereof.

BACKGROUND ART

Conventionally, as a functional component for an automobile, there is disclosed an automobile auxiliary direction indicator-cum-side irradiation device including: an auxiliary direction indicator connected to a turn signal switch to blink at a lower portion of a door mirror mounting base; a plastic cover which allows irradiation light of the auxiliary direction indicator to pass through itself to the outside and which extends from a front face to a side face around part of a back face; and a side marker light and an irradiating portion for applying light from a light-emitting irradiating body connected to an input of a back gear to light up on a back face (see Patent Document 1). This auxiliary direction indicator can be blinked in a higher position than a normal direction indicator and in a position out of a vehicle width, which facilitates visibility to surrounding vehicles and pedestrians. Moreover, because especially an area around a rear wheel is brightly irradiated during reverse traveling at nighttime, in a dark place, or in the rain, it is possible to reliably carry out putting into a garage, parking, and turning around of a vehicle.

PRIOR ART DOCUMENT

Patent Document

Patent Document 1: JP 3100024 U

DISCLOSURE OF THE INVENTION

Problems to be Solved by the Invention

However, the conventional door mirror is combined with a light-emitting block formed separately to obtain a light-emitting function of the vehicle functional component. Such a door mirror requires a relatively complicated structure, because it is necessary to secure a space for housing the light-emitting block in order to obtain the light-emitting function. Furthermore, because the members are formed separately, it impairs design of the vehicle functional component itself. Therefore, the door mirror is not necessarily excellent in beauty or appearance.

Therefore, it is an object of the present invention to provide a vehicle functional component which can obtain its light-emitting function with a relatively simple structure and in a relatively compact form, design of which is not impaired, and which is excellent in beauty and appearance.

Means for Solving the Problems

To solve the above problems, the present invention employs the following means (1) to (12).

(1) A vehicle functional component of the present invention includes
 a molded cover (1) molded into a shape of a surface of a part attached to a vehicle and
 a surface-emitting device (2) bonded or fitted and fixed along a back face of the molded cover (1),
 wherein the molded cover (1) is vacuum formed by solid decorative molding of a translucent resin molded member with a translucent film, and
 light from the surface-emitting device (2) is transmitted through the molded cover (1) and emerges in a predetermined light-emitting area which is a part of a surface of a vehicle component.

(2) In the vehicle component according to the above, preferably, the molded cover (1) is provided to cover a surface of a support frame (3) mounted to a vehicle main body and
 the surface-emitting device (2) is supported on a stay (31/351, 352) formed inside the support frame (3) and fixed into the support frame (3) while kept at a distance from the molded cover (1).

(3) In the vehicle component according to any of the above, preferably, a light transmissive film (4) having a light diffusion effect is disposed between a back face side of the molded cover (1) and a surface side of the surface-emitting device (2) and the light from the surface-emitting device (2) passes through the light transmissive film (4) and shines on a surface side of the molded cover (1) in a diffused state.

(4) In the vehicle component according to any of the above, preferably, the surface-emitting device (2) includes a sheet-shaped board (21), a plurality of surface light-emitting sources (22) arranged on a surface side of the board (21), a board wire (23) installed on the board (21) across between the respective surface light-emitting sources (22), and an extension wire (24) electrically connected to the board wire (23) and extending from one end of the board (21),
 the support frame (3) includes a housing space (32) for housing the board (21) and a wiring hole (33) which is formed close to one end of the housing space (32) and through which various wires are inserted, and
 the extension wire (24) of the board (21) housed in the housing space (32) is inserted through the wiring hole (33) and connected to a switch circuit and a power supply provided in the vehicle main body or the housing space (32).

(5) In the vehicle component according to (4), preferably, the housing space (32) in the support frame (3) houses a sensor part for sensing a predetermined operational signal from a user together with the surface-emitting device (2) and
 the switch circuit carries out switching operation in synchronization with the predetermined operational signal sensed by the sensor part to blink or light the surface-emitting device (2).

(6) In the vehicle component according to any of the above, preferably, the surface-emitting device (2) includes a plate-shaped light guide body (26) having an upper face as a light guide face, a light-emitting source (27) disposed on a side face side of the light guide body (26) to incident into the light guide body (26), and an extension wire (24) electrically connected to the light-emitting source (27) and extending from a side portion of the light guide body (26),
 the support frame (3) includes a support structure (36) capable of supporting the light guide body (26) and the light-emitting source (27) respectively at predetermined heights and a wiring hole which is formed near one end of the support structure and through which various wires are inserted, the extension wire (24) of the light-emitting source (27) supported at the predetermined height is inserted through the wiring hole and connected to a switch circuit and a power supply provided in the vehicle main body or the support structure (36).

(7) In the vehicle component according to (6), preferably, the support structure of the support frame (3) supports a sensor part for sensing a predetermined operational signal from a user together with the surface-emitting device (2) and the switch circuit carries out switching operation in synchronization with the predetermined operational signal sensed by the sensor part to blink or light the surface-emitting device (2).

(8) In the vehicle component according to (5) or (7), preferably, the support frame (3) forms one of an automobile door handle, a side pillar, and a body side molding while covered with the molded cover (1), and the sensor part senses an opening/closing operational signal of an automobile door key based on conductive contact with the molded cover (1) or the support frame (3).

(9) In the vehicle component according to (5) or (7), preferably, the support frame (3) forms one of an automobile door mirror, a rear garnish, and an indicator light cover while covered with the molded cover (1), and the sensor part senses an opening/closing operational signal of an automobile door from the user or an operational signal of a turn signal from the user.

(10) In the vehicle component according to any of the above, preferably, the molded cover (1) is vacuum formed by solid decorative molding of an entire surface of a partially colored transparent or colorless transparent resin molded member with a translucent film, the surface-emitting device (2) is disposed on a back side of the colored transparent or colorless transparent portion of the resin molded member, a remaining portion of the resin molded member excluding the colored transparent or colorless transparent molded face is formed to be non-translucent, and the non-translucent structure restricts the light-emitting area of the surface-emitting device (2).

(11) In the vehicle component according to any of the above, preferably, a masking member (5) from which a shape of the light-emitting area is cut out is brought into contact with the back face of the molded cover (1).

(12) In the vehicle component according to any of the above, preferably, the resin molded member (11), being transparent or semi-transparent and formed into a shape of the light-emitting area, is formed by embedding/integrating molding into the cutout portion of the resin molded member (1) being opaque from which the shape of the light-emitting area is cut out.

Effects of the Invention

With the above-described means, by obtaining a light-emitting function of the vehicle functional component by transmissive light emission of the surface-emitting device provided inside the vehicle functional component itself, the structure combined with the light-emitting block in the prior art becomes unnecessary and it is possible to obtain the light-emitting function with the relatively simple and compact structure while saving space for housing the light-emitting body. Moreover, it is possible to provide the vehicle functional component excellent in beauty and appearance with a non-conventional light-emitting form.

BRIEF DESCRIPTIONS OF THE DRAWINGS

FIGS. 7(a) and 7(b) are front views showing mounted states of a vehicle functional component in embodiment 4 of the invention in a first light-emitting state (FIG. 7(a)) and a second light-emitting state (FIG. 7(b)).

Figure 8:
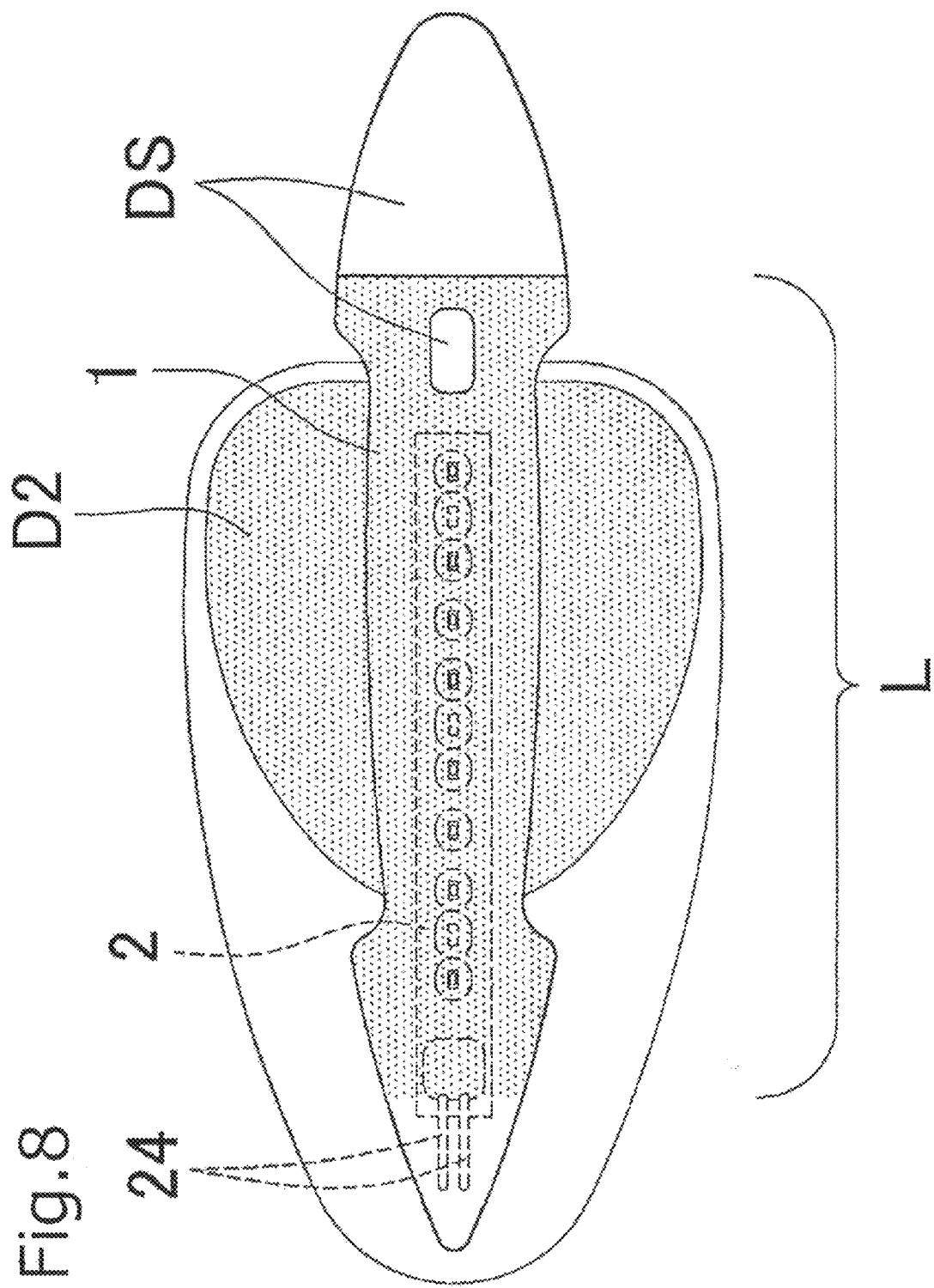

FIG. 8 is a front view showing a mounted state of a vehicle functional component in embodiment 5 of the invention in a light-emitting state.

Figure 9:
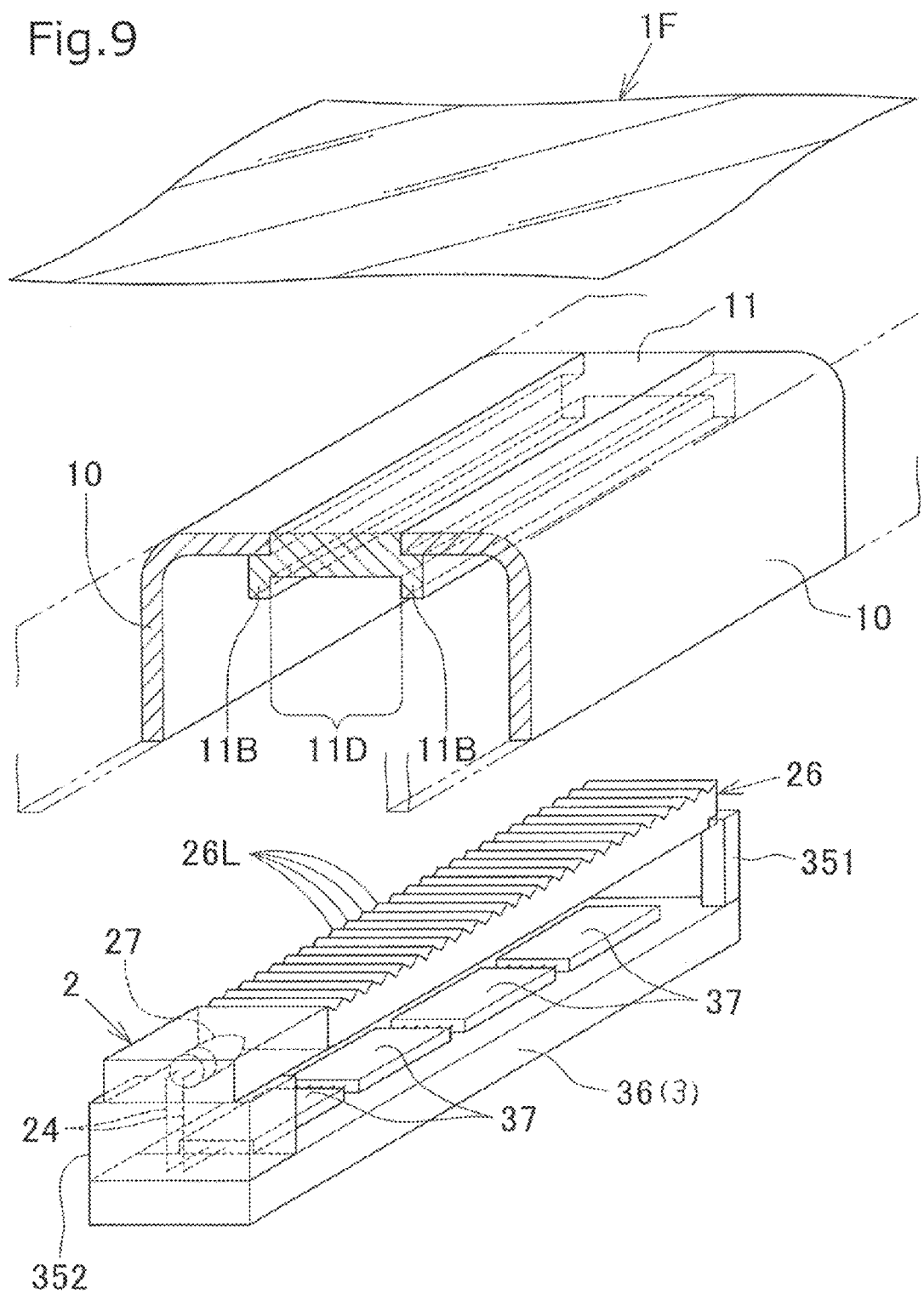

FIG. 9 is a partially-cutaway exploded perspective view showing a structure of a vehicle functional component in embodiment 6 of the invention.

Figure 10:
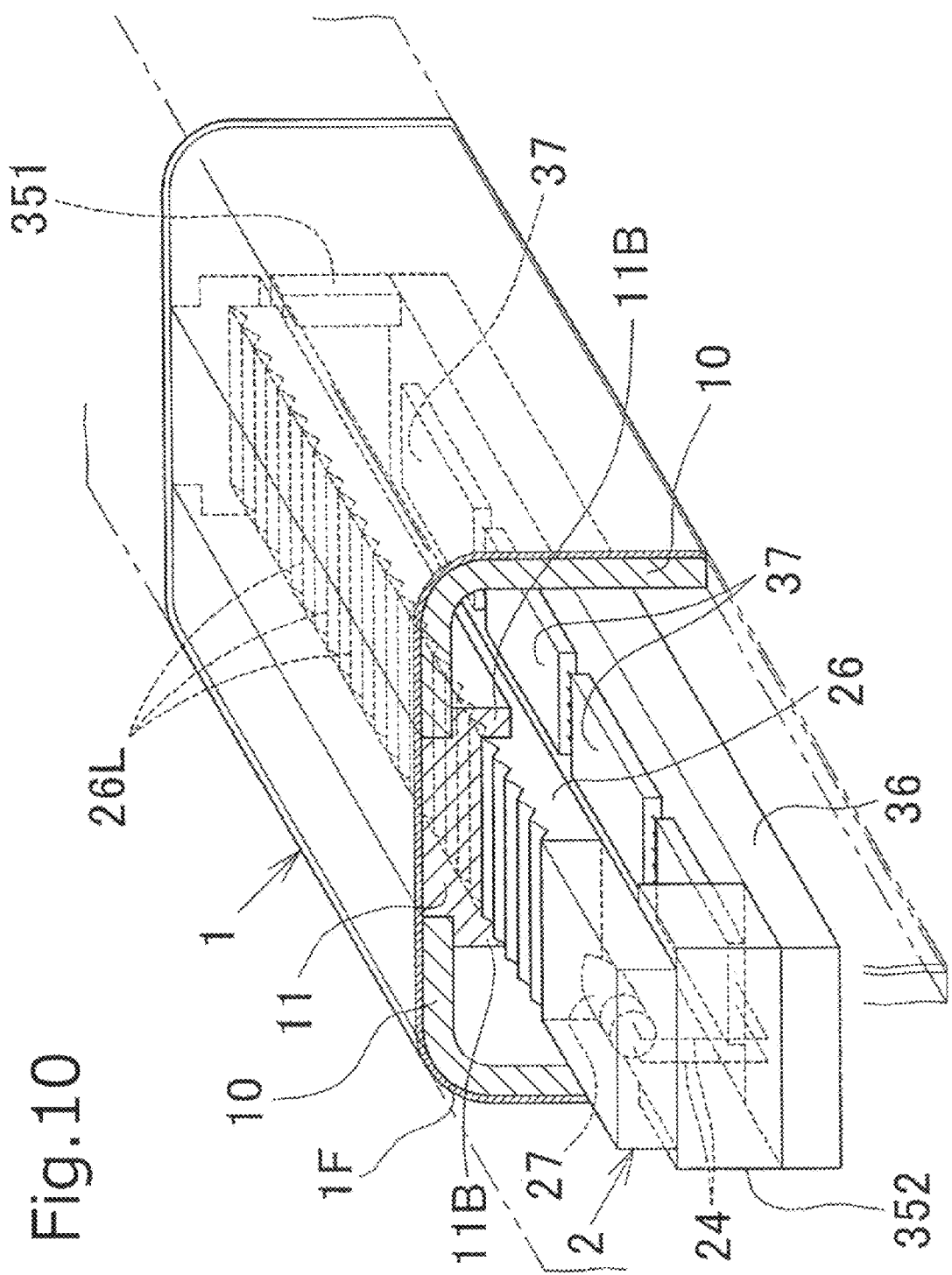

FIG. 10 is a partially-cutaway perspective view showing the structure of the vehicle functional component in embodiment 6 of the invention.

Figure 11:
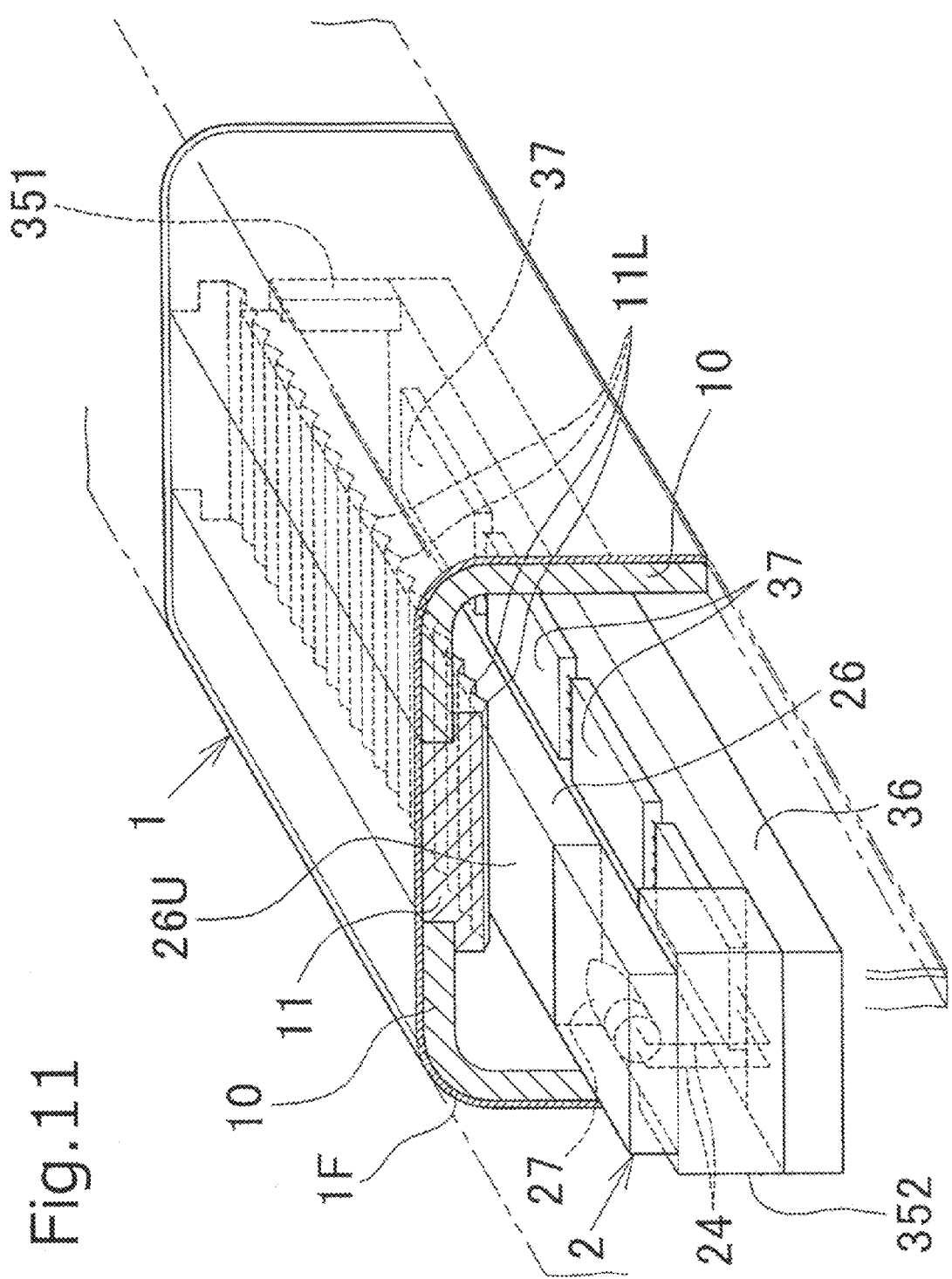

FIG. 11 is a partially-cutaway perspective view showing a structure of a vehicle functional component in embodiment 7 of the invention.

Figure 12:
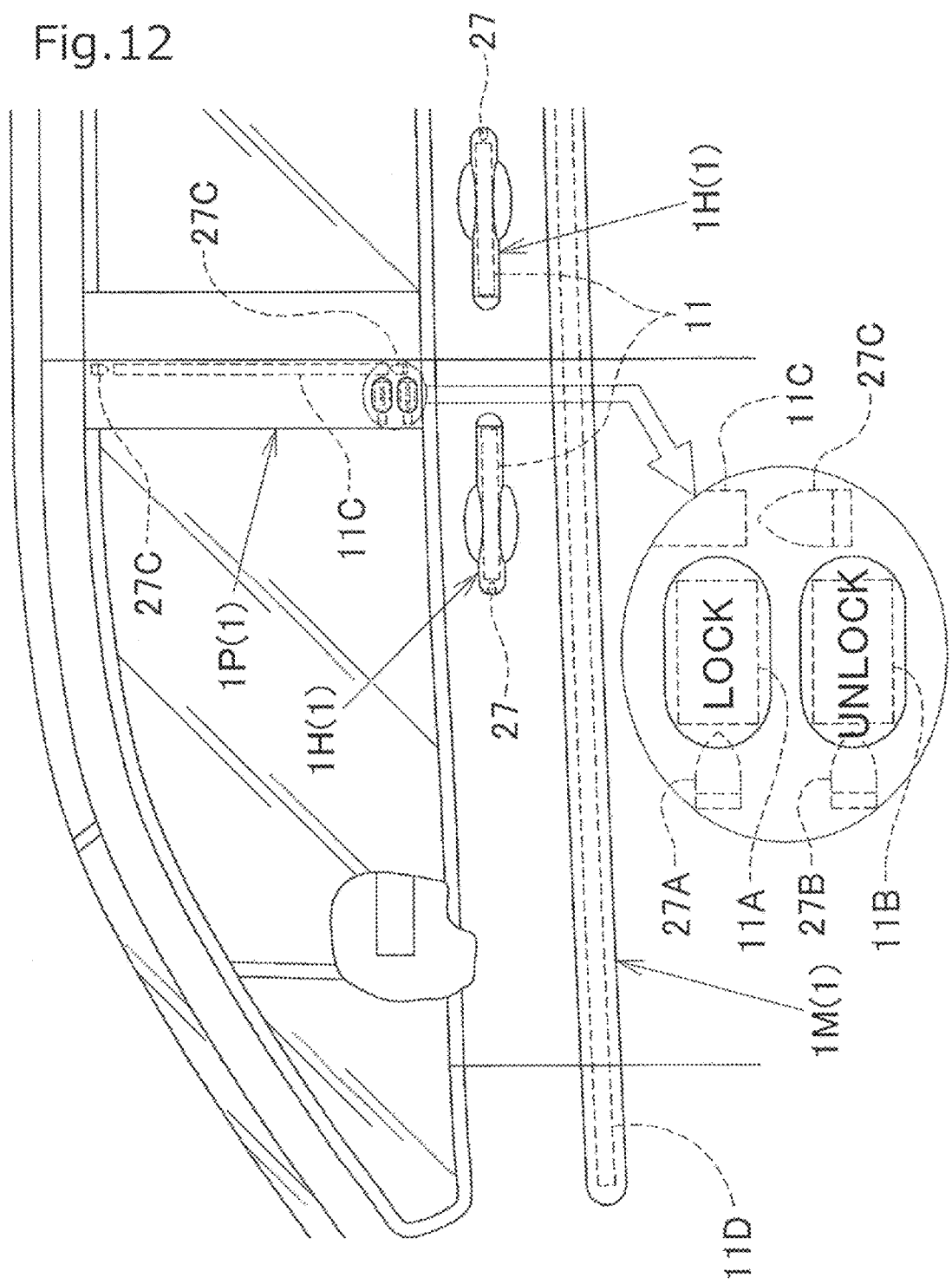

FIG. 12 is a drawing showing mounted states of vehicle functional components in embodiment 8 of the invention to an automobile door handle, a side pillar, and a body side molding.

FIGS. 13(a) and 13(b) are drawings showing mounted states of vehicle functional components in embodiment 9 of the invention to a front grille and an emblem.

Figure 14:
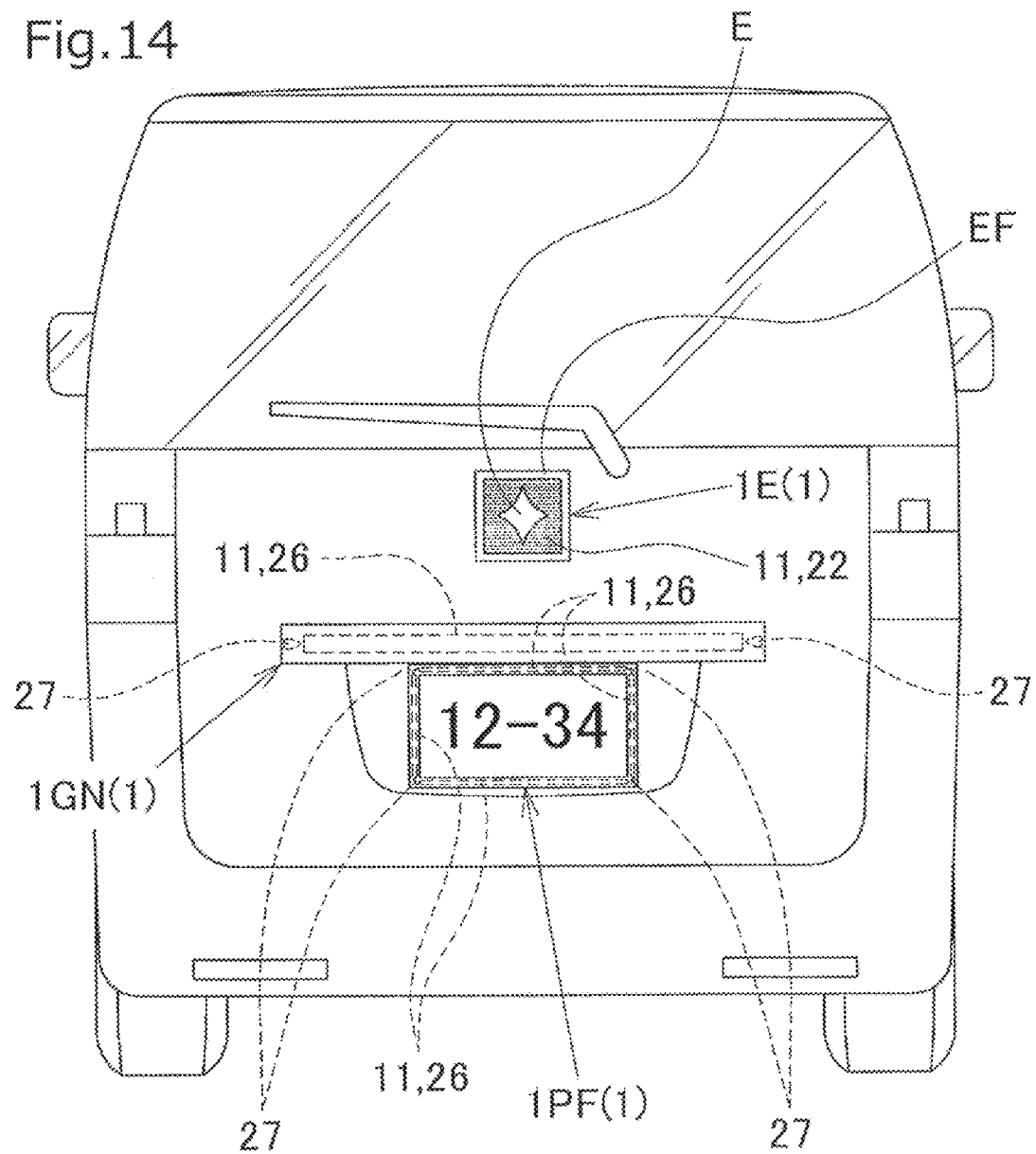

FIG. 14 is a drawing showing mounted states of vehicle functional components in embodiment 10 of the invention to a rear garnish, a plate frame, and an emblem.

BEST MODES FOR CARRYING OUT THE INVENTION

Modes for carrying out the present invention will be described below with reference to FIGS. 1 to 4 showing a vehicle functional component in embodiment 1, FIGS. 5 to 11 showing vehicle functional components in embodiments 2 to 7, and FIGS. 12 to 14 showing examples of use of these vehicle functional components. In each of the embodiments, the vehicle functional component in the invention is basically formed by a molded cover 1 molded into a shape of a surface of a part attached to an automobile and a surface-emitting device 2 bonded or inserted and fixed along a back face of the molded cover 1. Light from the surface-emitting device 2 is transmitted through the molded cover 1 and emerges as a transmissive light-emitting portion L at a portion of a surface of the vehicle functional component. As used herein, the vehicle includes a two-wheel vehicle, a four-wheel vehicle, a three-wheel vehicle, and also a motorized bicycle and includes a passenger vehicle and also a remotely-driven vehicle, a hand cart, and a tow truck.

(Molded Cover 1)

The molded cover 1 is provided to cover a surface of a support frame 3 mounted to a vehicle main body. The surface-emitting device 2 (described next) is retained by stays 31 formed inside the support frame 3 and fixed into the support frame 3 while kept at a distance from the molded cover 1. As used herein, the molded cover 1 is a solid decorative molded article vacuum formed by decorative molding of a resin molded member 10, which is molded and made of translucent resin, with a decorative film 1F having translucency and is not subjected to electroforming treatment such as plating. In other words, although a conventional plated article is non-light transmissive member, it is possible to freely set whether or not the decorative film 1F is made light transmissive and light transmittance by selecting the resin molded member 10 and the decorative film 1F in the case of the molded cover 1 having a surface vacuum formed by solid decorative molding with the decorative film 1F. A light transmitting area from the molded cover 1 can be controlled by masking treatment of the molded cover 1 or embedding/integrating molding of an opaque resin molded member and a transparent resin molded member and also by a light-emitting position, a light-emitting direction, and directional characteristics (light-emitting area) of the surface-emitting device 2. The masking treatment mentioned herein includes various methods such as formation of an opaque coating on a surface or a back face of the molded cover 1, covering of the back face of the molded cover 1 with a masking member 5, adjustment of the thickness of the molded cover 1 itself, i.e., formation of a thick-walled portion or a rib, and formation of a stud or a rib for fitting. The embedding molding of the opaque resin molded member and the transparent resin molded member includes punching a portion of the opaque resin molded member into a shape of a light-emitting area, and embedding the transparent resin molded member into the punched portion to be molded. The integrating molding includes integration of the opaque resin molded member, a portion of which is punched into the shape of the light-emitting area, and the transparent resin molded member molded in advance into a shape of the punched portion.

(Surface-Emitting Device 2)

The surface-emitting device 2 is a light-emitting body for emitting light to a curved or flat light distribution face and includes a member formed by a flat light-emitting body having a base with a curved or flat light distribution face and one or a plurality of light-emitting device (s) disposed on the light distribution face of the base and also includes a member formed by a light guide body with a light-emitting source and having a plate-shaped light guide body 26, which has a side face as an incident face and an upper face as an emission surface of guided light, and a light-emitting source 27 disposed on the incident face of the light guide body 26 to incident into the light guide body 26, for example. The light from the light-emitting device (s) is distributed to an upper face side with respect to a face on which the device lies and expands over the upper face. Because the light is less likely to come around to a back side of the light distribution face, it is easy to secure an amount of light from the light-emitting device (s) to the light distribution face side. Moreover, by forming the base into a thin plate shape or a thin film shape, it is easy to make the surface-emitting device 2 compact. If the base itself has flexibility, it is easy to deform the surface-emitting device 2 along a molded face of the molded cover 1. The surface-emitting device 2 is disposed with its light distribution face facing the back face of the molded cover 1. As used herein, the light distribution face is preferably formed along the back face of the molded cover 1 to be parallel thereto and arranged at a predetermined or longer distance from the back face of the molded cover. The light transmitting area from the surface-emitting device 2 to the molded cover 1 is controlled by direct masking treatment of the surface-emitting device 2. As used herein, the masking treatment of the surface-emitting device 2 includes various methods such as covering of the surface-emitting device 2 with a masking member 5 with or without contact between them, formation of a coating by coloring of a device cover, and disposition of a light shielding plate (including a light shielding sheet and a light shielding film) between the surface-emitting device 12 and the molded cover 1.

The surface-emitting device 2 may be integrally formed by a plate-shaped light guide body 26 having a side face as an incident face and an upper face as an emission face of guided light and a light-emitting source retaining portion which is in contact with the incident face of the light guide body 26 and in which a light-emitting source 27 is embedded, the light guide body 26 and the light-emitting source retaining portion being adjacent to and in contact with each other and arranged side by side in a longitudinal direction of the light guide body 26 which is in a rectangular plate shape in a plan view (see FIGS. 9, 10, and 11). In this case, the light-emitting source 27 radiates and emits light sideway toward a side face of the light guide body, the light is refracted and reflected in the light guide body, and an entire upper face of the light guide body emits the light.

(Support Frame 3)

The support frame 3 is a partial constituent member for supporting the molded cover 1 with the frame when the molded cover 1 is provided to cover an open upper face or side face of the support frame 3 and forms the vehicle functional component together with the molded cover 1 while covered with the molded cover 1.

As used herein, the vehicle functional component in the invention refers to an attached member other than a light-emitting part and for exerting some function, when it is attached to an outer side of or inside a main body of an automobile or a motorcycle, and includes exterior equipment such as an automobile door mirror, a rearview mirror for a motorcycle, an automobile door handle, a mounting frame (depressed frame portion D2) for a door handle, a fender, a grille, an oil filler cover, an exposed oil filler cap, a mirror cover, an exposed oil filler cap, side pillars (an A-pillar, a B-pillar, and a C-pillar), a body side molding, a rear garnish, an emblem, a plate frame, an antenna, an indicator light cover, and an antenna and exterior and interior equipment such as various meters and various control levers. Some function includes aesthetic and non-aesthetic visibility functions, protective functions, opening and closing/locking functions of various doors, and the like.

The support frame 3 includes, inside itself, a housing space 32 for housing the light-emitting device 2 together with the functional component for performing some function described above and also includes a mounting portion to the vehicle main body. In the housing space 32, the surface-emitting device 2 is housed to be exposed at least to a portion of a side portion or an upper portion of the functional component. In the housing space 32, a wiring hole 33 communicating with and opening into the vehicle main body through the mounting portion is formed. Wires for the functional component housed in the housing space 32 and wires for light emission of the surface-emitting device 2 are inserted through the wiring hole 33.

(Sensor Part)

The housing space 32 may house a sensor part for sensing a predetermined operational signal from a user together with the surface-emitting device 2. A switch circuit carries out switching operation in synchronization with an opening/closing operation signal of a key received by the sensor part to blink or light the surface-emitting device 2. In this case, extension wires 24 of the surface-emitting device 2 are inserted through the wiring hole 33 and connected to the switch circuit and a power supply in the vehicle main body.

As another structure, the support frame 3 itself may form one of an automobile door handle, a side pillar, and a body side molding while covered with the molded cover 1. In this case, the sensor part may sense the opening/closing operation signal of an automobile door key based on conductive contact with the molded cover 1 or the support frame 3.

As yet another structure, the support frame 3 itself may form one of an automobile door mirror, a rear garnish, and an indicator light cover while covered with the molded cover 1. In this case, the sensor part may sense the operational signal of opening/closing operation of an automobile door by a user or an operational signal of operation of a turn signal from a user.

The switch circuit and/or the power supply may be housed in the housing space 32. In this case, wires for the power supply are not inserted through the wiring hole 33 and only a connecting line for sending an operation instruction signal or an operation signal of the functional component is inserted through the wiring hole 33 so that the vehicle main body and the functional component are electrically connected.

(Light Transmissive Film 4)

If needed, the light transmissive film 4 having a light diffusion effect may be disposed between the back face side of the molded cover 1 and a surface side of the surface-emitting device 2. If the light transmissive film 4 is disposed, the light from the surface-emitting device 2 passes through the light transmissive film 4 and shines on the surface side of the molded cover 1 in a diffused state. With the light diffusion effect of the light transmissive film 4, it is possible to secure a proper degree of diffusion of the light source, even though the surface-emitting device 2 is close to the molded cover 1. As used herein, the light diffusion effect includes lens effects due to lens working of a surface or a back face of the film and effects due to various types of working such as random dent (emboss) working, molding by mixture or adhesion of translucent diffusing particles into an inner face or respective faces of the film, formation of steps or a corrugated face by deformation of the film itself, and coating of the surface with a diffusive fixing agent. Moreover, as for the light transmissive film 4, a sheet-shaped or plate-shaped film is included irrespective of the thickness. Furthermore, a single-layer film and also a multi-layer molded film made of the same or different materials are included. Moreover, if a part of the light transmissive film 4 is masked, it is possible to restrict a light transmitting area. If the light transmissive film 4 is subjected to polarization treatment, it is possible to restrict part of the diffusion effect. Respective structures in the embodiments will be specifically described below.

Embodiment 1

The vehicle functional component in embodiment 1 shown in FIGS. 1 to 4 forms an automobile door handle by covering the support frame 3 with the molded cover 1. For example, the door handle is configured such that an electric key K (not shown) for opening and closing is included in the inner housing space 32, a narrow and long sheet-shaped surface-emitting device 2 formed by successively arranging surface light-emitting sources 22 formed by LED devices in a line is disposed on an upper face side of the electric key K, and the light transmissive film 4 having a surface corrugated in a predetermined pattern shown in FIG. 4, for example, is disposed along the light distribution face which is an upper face of the surface-emitting device 2. The surface-emitting device 2 and the light transmissive film 4 are substantially in the same shapes and molded into narrow and long rectangular shapes along an extending upper face of a door handle shape of the molded cover 1.

The surface-emitting device 2 in embodiment 1 includes a sheet-shaped board 21, the plurality of surface light-emitting sources 22 arranged in a line on a surface side of the board 21, board wires 23 installed on the board 21 across between the respective surface light-emitting sources 22, and the extension wires 24 electrically connected to the board wires 23 and extending from one end of the board 21. The surface light-emitting sources 22 are formed by the LED light-emitting devices arranged planarly in rectangular frames and respective upper faces of the rectangular frames of the respective devices are covered with transparent lens covers in shapes of spherical caps and have light diffusion properties due to the lens effects of the lens covers.

In embodiment 1, the wiring hole 32 is formed in a position close to one end of the oblong prism-shaped housing space 32 and corresponding to one of mounting leg portions of the support frame 3 to be mounted to the vehicle main body. The extension wires 24 of the surface-emitting device 2 are inserted through the wiring hole 32.

Figure 1:
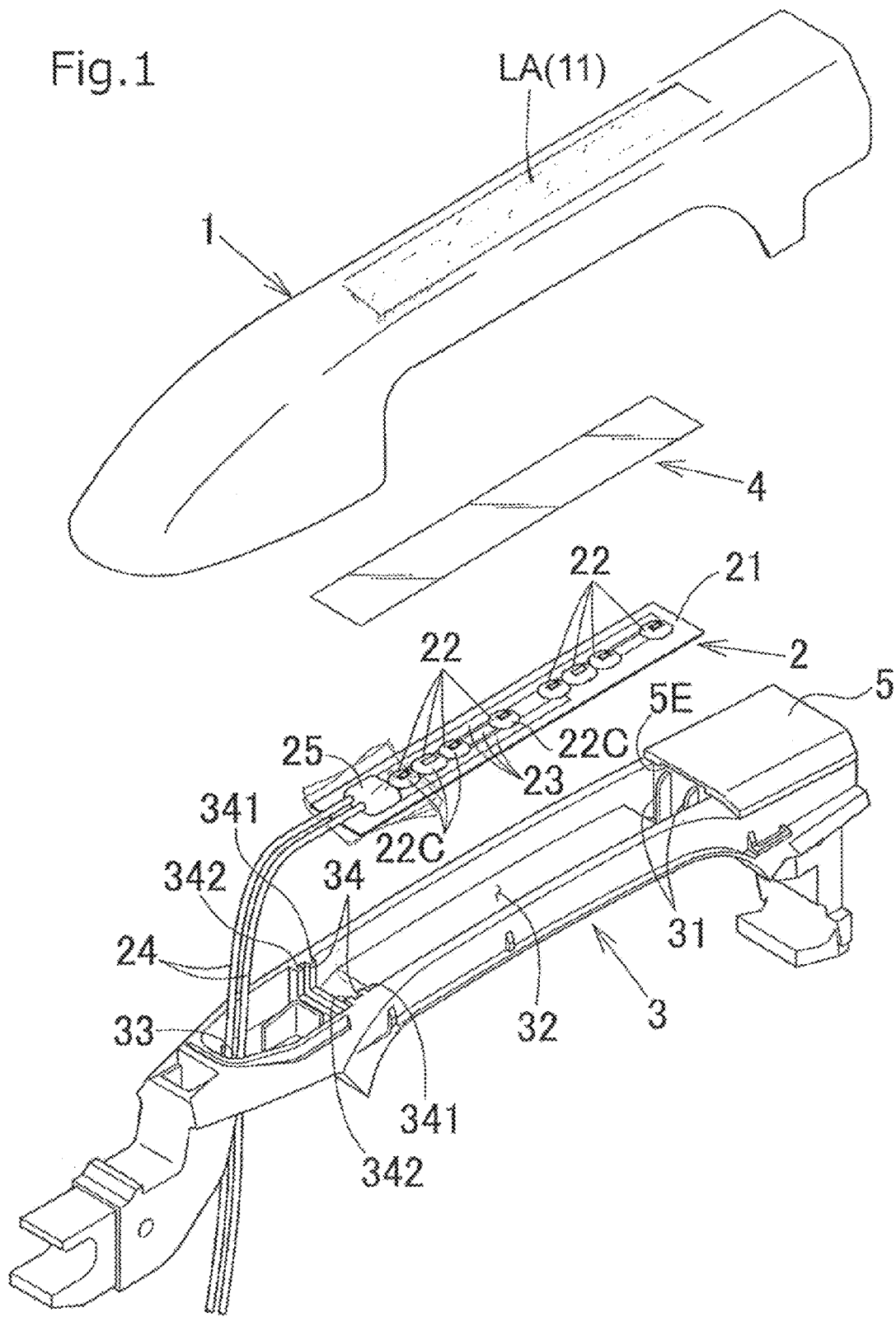
FIG. 1 is an exploded perspective view showing a structure of a vehicle functional component in embodiment 1 of the present invention.
Figure 2:
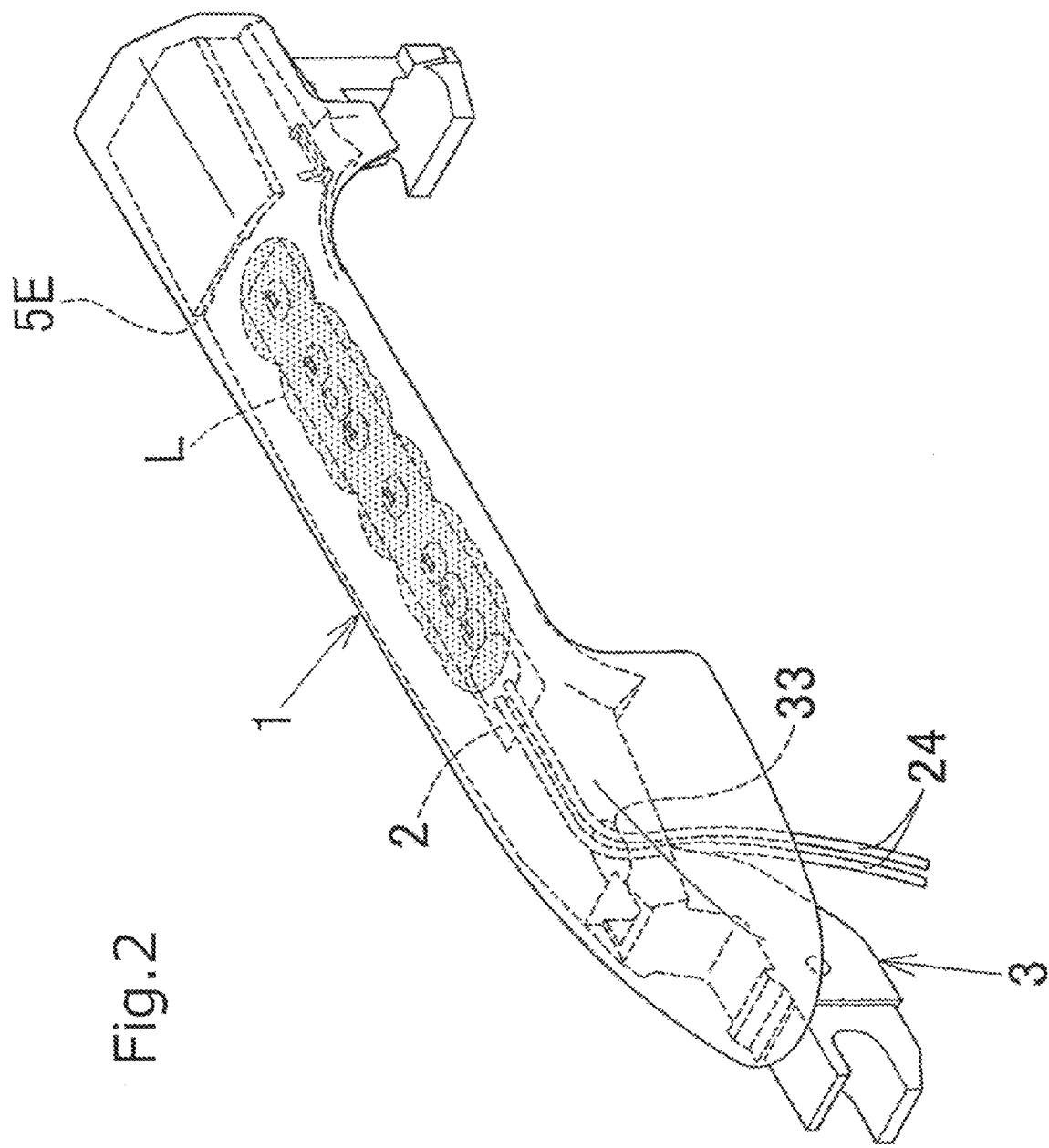
FIG. 2 is a perspective view showing a light-emitting state of the vehicle functional component in embodiment 1.

As shown in FIG. 2, a masking member 5 having a cover end facing the surface-emitting device 2 is attached to one end portion of the housing space 32 in the retaining frame 3 and the cover end 5E of the masking member 5 exerts a masking effect as one end edge of a light-emitting area. The cover end 5E is formed by cutting (punching) the end portion of the masking member 5 straight and the straight portion comes in contact with the back face of the molded cover 1 to form a masking end edge. The two stays 31 for retaining one end of the surface-emitting device 2 are formed to stand parallel in the housing space 32 at the one end portion of the housing space 32 in the retaining frame 3 and on an inner side of the cover end 5E. Upper ends of the stays 31 are molded into semicircular curved shapes and mounting base portions of the stays 31 are close to the cover end 5E. At the other end portion of the housing space 32 in the retaining frame 3, first retaining frames 341 and second retaining frames 342 for retaining the other end of the surface light-emitting device are formed to face an inside of the housing space 32 and to face each other, respectively. Because the first retaining frames 341 and the second retaining frames 342 are formed at small intervals in a longitudinal direction of the housing space, i.e., a longitudinal direction of the door handle, grooves 34 are formed between the frames. The one end portion of the board 21 of the surface-emitting device 2 may be bent, inserted, and fixed into the grooves 34.

Figure 3:
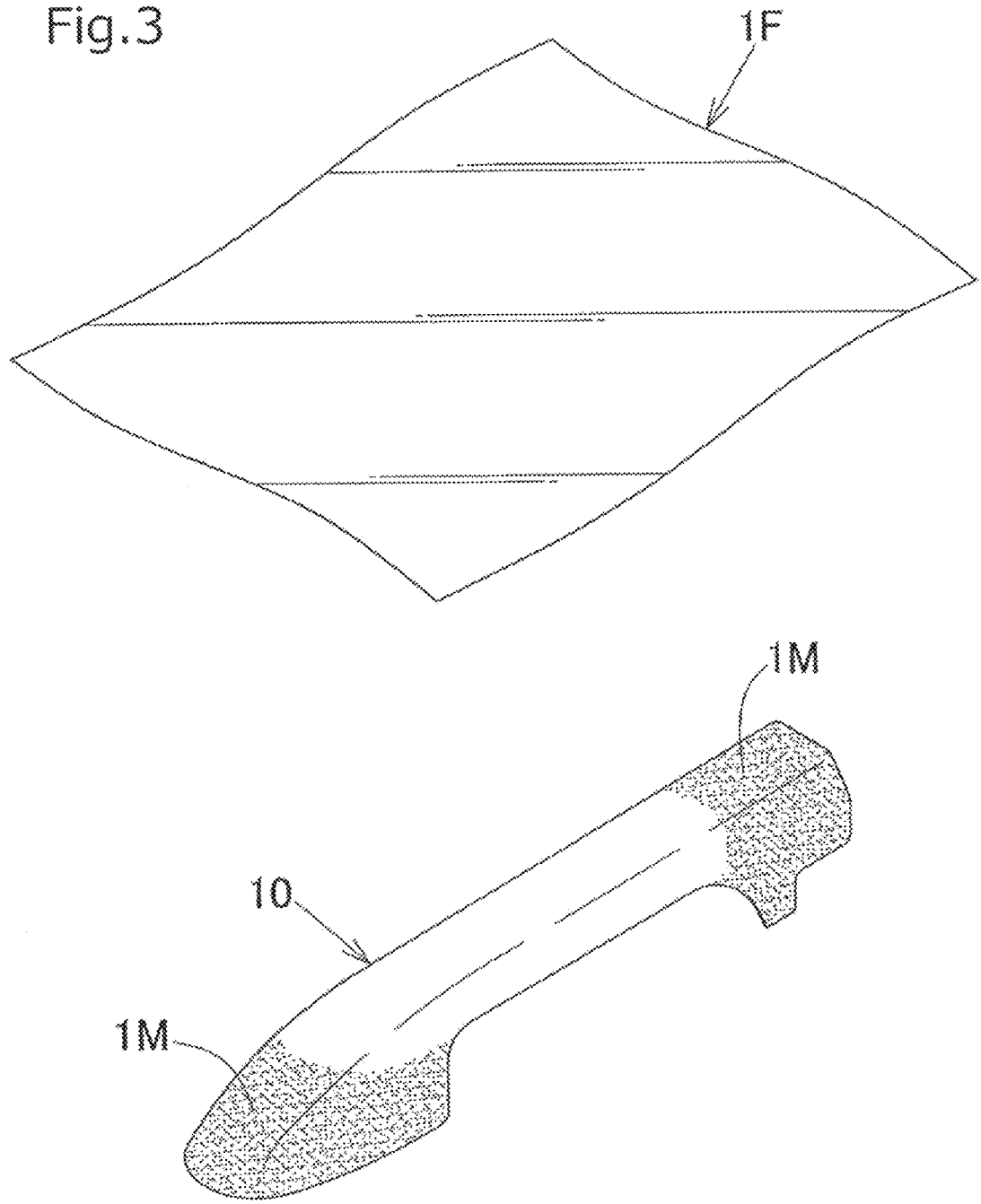
FIG. 3 is a perspective explanatory drawing showing constituent material of a molded cover 1 used for the vehicle functional component in embodiment 1.

As shown in FIG. 3, in the vehicle functional component in embodiment 1, the molded cover 1 is vacuum formed by solid decorative molding of a surface of a colored transparent or colorless transparent resin molded member with a plating-like translucent film. On a back side of a molded face of the resin molded member in embodiment 1, coatings of dark (black) paint are partially formed as non-translucent coating layers 1M around a position where the surface-emitting device 2 is disposed. With the coating layers 1M, the light-emitting area of the surface-emitting device 2 is masked and light emission is intercepted in unnecessary areas.

Figure 4:
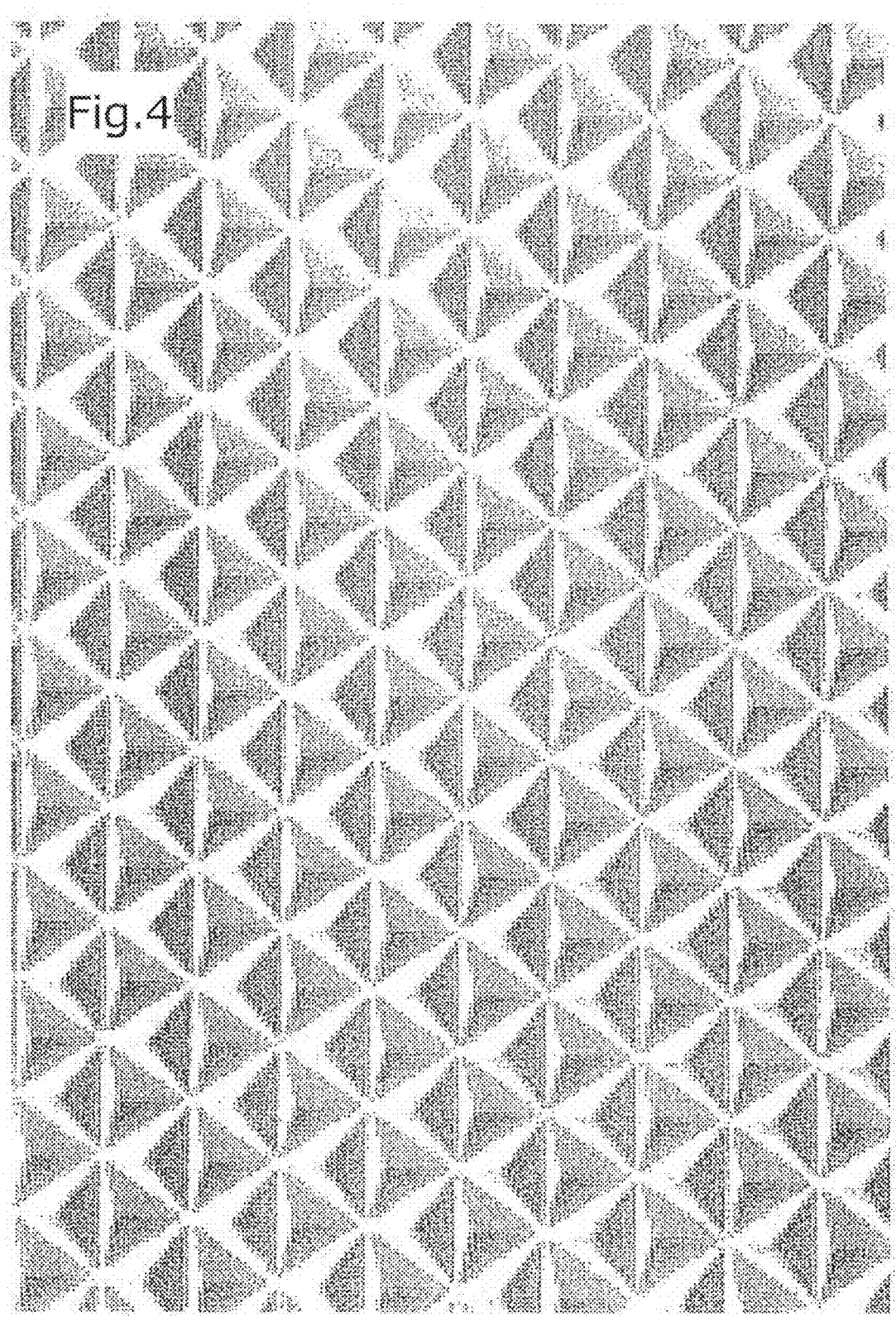
FIG. 4 is a plan explanatory drawing of an example of a surface treatment pattern of a light transmissive film 4 used for the vehicle functional component in embodiment 1.

On the surface of the transmissive film 4 in embodiment 1, three-dimensional lens portions in the same polygonal pyramid shapes are arranged and molded in a pattern in length and width directions as shown in FIG. 4, for example.

The surface-emitting device 2 in embodiment 1 formed in this manner emits light a predetermined times at the time of unlocking and locking, when the light-emitting switch operates in synchronization with key opening and closing operations of the electric key K which is the functional component housed inside. When the light is emitted, the transmissive light-emitting portion L formed of successive circles shown in FIG. 2 emerges in a line on an outer face of the molded cover 1.

Embodiment 2

Figure 5:
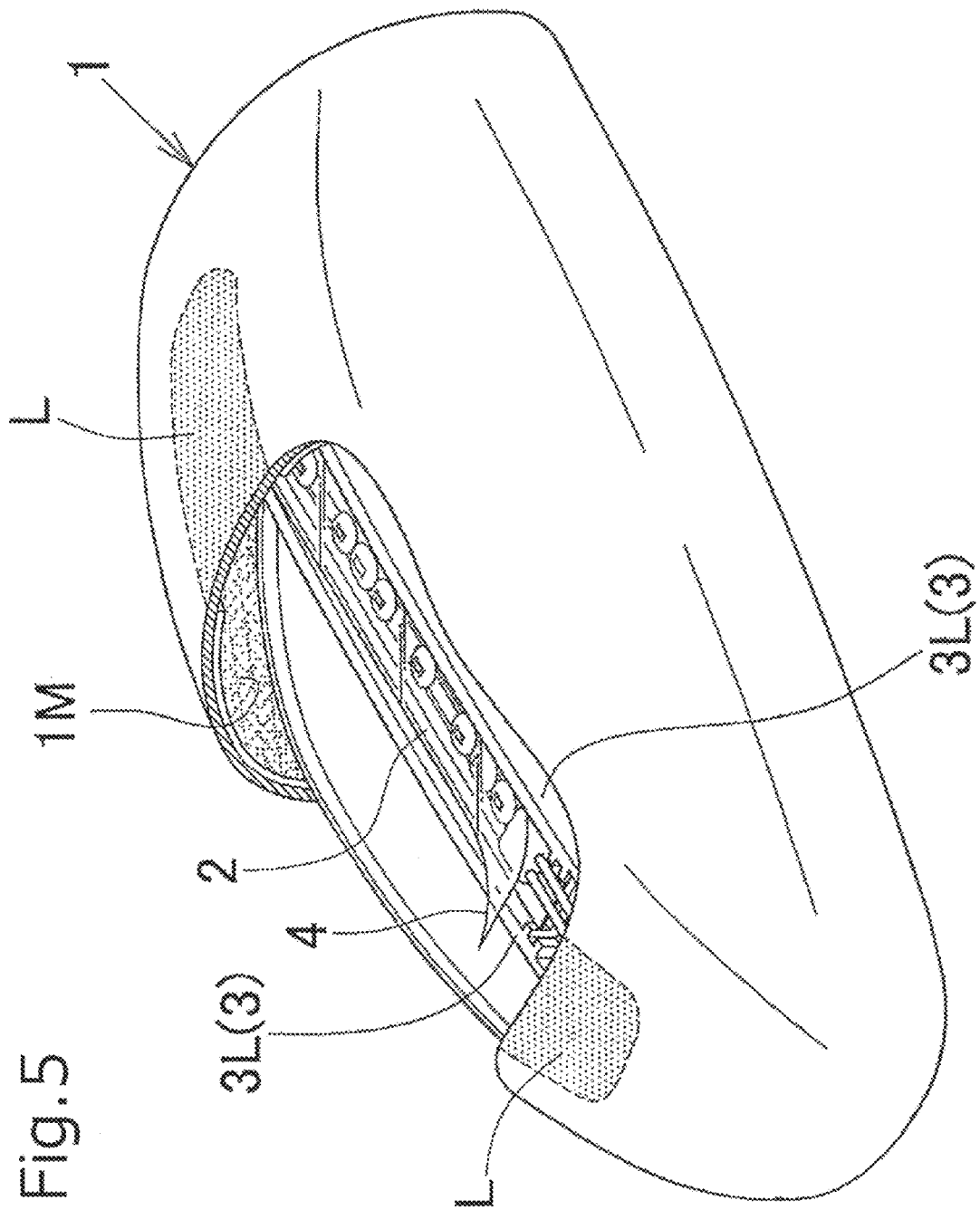
FIG. 5 is a partially-cutaway perspective view of a vehicle functional component in embodiment 2 of the invention.

In a vehicle functional component in embodiment 2 shown in FIG. 5, the support frame 3 forms an automobile door mirror while covered with the molded cover 1 and the sensor part housed in the housing space together with the surface-emitting device 2 senses the opening and closing operational signals of the automobile door or the turn signal operational signal from a user. Other structures, usages, and states of use which are not especially described are similar to those in embodiment 1.

Embodiment 3

Figure 6:
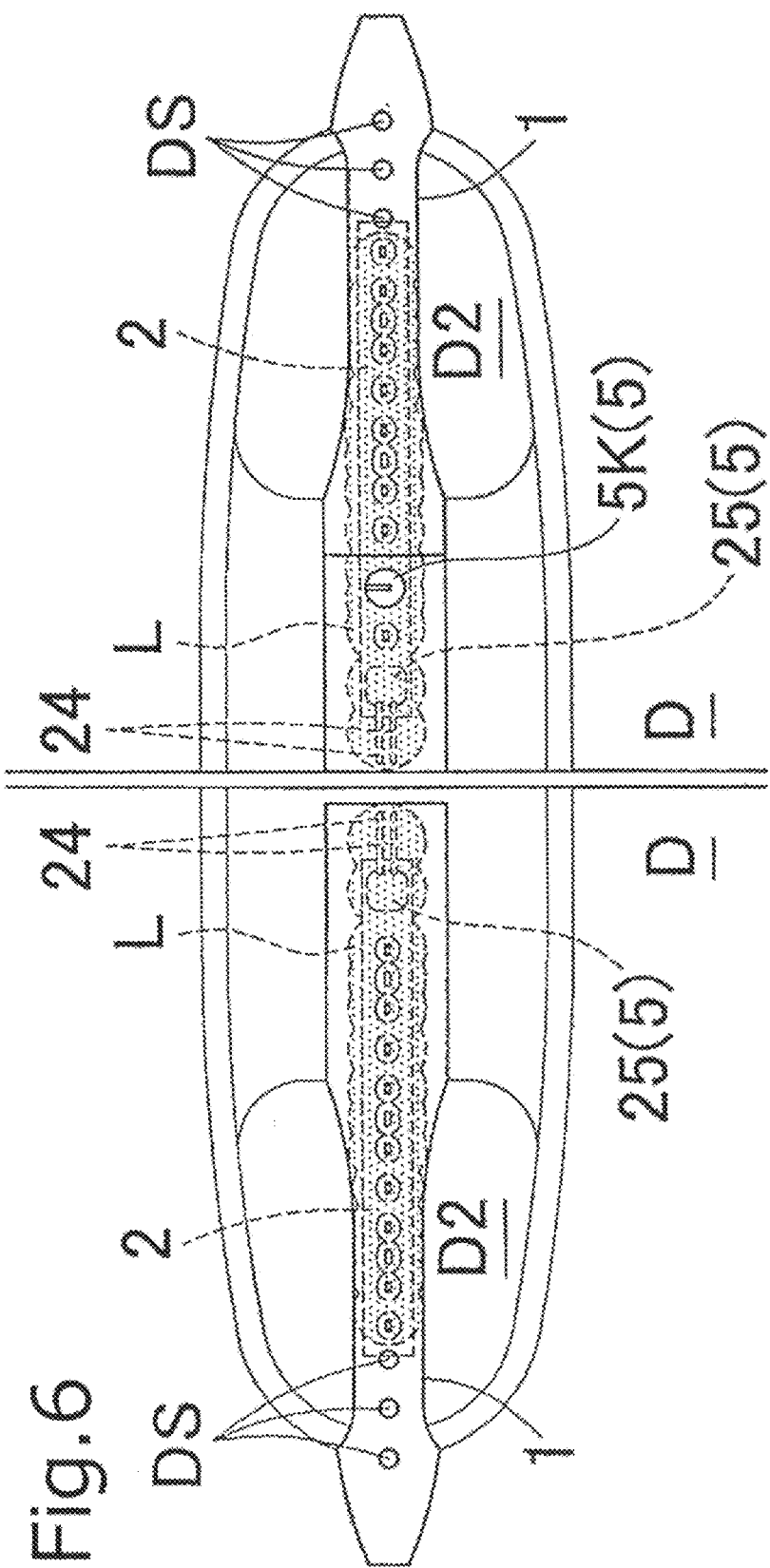
FIG. 6 is a front view showing a mounted state of a vehicle functional component in embodiment 3 of the invention.

In a vehicle functional component in embodiment 3 shown in FIG. 6, the support frame 3 forms an automobile door handle of each of a rear door and a front door while covered with the molded cover 1 and the sensor part housed in the housing space together with the surface-emitting device 2 senses the opening and closing operational signals of the automobile door or the turn signal operational signal from a user. In FIG. 6, oblong and narrow rectangular stick-shaped transmissive light-emitting portion L for each of the rear door and the front door is projected at the same height. Other structures, usages, and states of use which are not especially described are similar to those in embodiment 1.

Embodiment 4

In a vehicle functional component in embodiment 4 shown in FIGS. 7(*a*) and 7(*b*), the support frame 3 forms an automobile door handle while covered with the molded cover 1 and the sensor part housed in the housing space together with the surface-emitting device 2 senses the opening and closing operational signals of the automobile door or the turn signal operational signal from a user. Especially in the embodiment, as shown in FIGS. 7(*a*) and 7(*b*), it is possible to achieve two light-emitting states, i.e., the light-emitting state of first transmissive light-emitting areas LA, in which only first surface light-emitting devices 22A molded successively in groups of three out of the surface light-emitting devices 22 arranged successively emit light as shown in FIG. 7(*a*), and the light-emitting state of second transmissive light-emitting areas LB, in which only second surface light-emitting devices 22B each disposed alone between the first surface light-emitting devices 22A at an interval out of the surface light-emitting devices 22 arranged successively emit light as shown in FIG. 7(*b*). For example, by emitting the light while switching between the light-emitting states in FIG. 7(*a*) and FIG. 7 (*b*) at the time of locking and unlocking of the automobile key, locking and unlocking operations can be clearly distinguished from each other and recognized. Reference characters DS in FIGS. 7(*a*) and 7(*b*) designate contact switches and unlocking can be carried out by simultaneously gripping both the switch portions for energization. Other structures, usages, and states of use which are not especially described are similar to those in embodiment 1.

Embodiment 5

The support frame 3 in embodiment 5 shown in FIG. 8 forms an automobile door handle while covered with the molded cover 1. The sensor part in embodiment 5 has one of contact switches exposed as a portion of the molded cover and, when the molded cover 1 itself is in a conductive contact with the contact switch to come into a conductive state, senses opening and closing operational signals of an automobile door key. To put it concretely, a movable portion and an immovable portion of the door handle are arranged in a horizontal direction in a front view and the rectangular contact switch DS is exposed on the portion of the molded cover 1 of the movable portion. A surface portion of the molded cover 1, which is the movable portion, excluding the contact switch DS or a surface portion of the entire molded cover of the immovable portion is the other contact switch. When the one contact switch DS comes in contact with the other contact switch while in contact with a hand of a human body, the sensor part comes into the conductive state to sense the opening/closing signal.

In embodiment 5, the entire molded cover 1 of the movable portion excluding a left end is formed as a transmissive light-emitting portion L and the entire transmissive light-emitting portion L has light diffusion effect and reflects and projects light in a diagonal lattice pattern. In embodiment 5, a door depression is formed by a reflector D2 and the light is reflected by the reflector D2 of the depressed face when the surface-emitting device 2 emits the light. Other structures, usages, and states of use which are not especially described are similar to those in embodiment 1.

Embodiment 6

A structure of an automobile functional component in embodiment 6 shown in FIGS. 9 and 10 includes: a molded cover 1 formed by insert molding by using resin molded member 11 in which only a transmissive window portion for partially transmitting light is transparent or semi-transparent; a translucent film 1F for solid decorative molding of an entire surface of the molded cover 1; a plate-shaped light guide body 26 disposed close to a back side of the transparent or semi-transparent resin molded member 11 of the molded cover 1 to guide the light to a side of the transparent or semi-transparent resin molded member 11; a light-emitting source 27 disposed on a side face side of the light guide body 26 to incident into the light guide body 26; and extension wires 24 electrically connected to the light-emitting source 27 and extending from a side portion of the light guide body 26 (FIGS. 9 and 10).

The molded cover 1 in embodiment 6 is formed by integrally molding opaque resin molded member 10 and the transparent or semi-transparent resin molded member 11 by insert molding. This is obtained by insert molding by cutting out a portion of the opaque resin molded member 1 and corresponding to a light-emitting area into a window shape and embedding the transparent or semi-transparent resin molded member 11, having a surface worked into a shape of a molded member for covering the light-emitting area, into the portion of the opaque resin molded member 1 formed by the cutting out. The transparent or semi-transparent resin molded member 11 is mounted into the notched window portion in the opaque resin molded member 10 to form a surface continuous with the opaque resin molded member 10 and, on the back side of the molded cover 1, is bent outward at positions near opposite side edges of the notched window portion to form protruding ribs 11B protruding downward. The protruding ribs 11B at the opposite side edges of the notched window portion extend along opposite sides of the notched window to form support frames for a surface-emitting device 6. In embodiment 6, a depressed face is formed between the protruding ribs 11B of the transparent resin molded member 11 and molded faces of Fresnel lenses 1F of the light guide body 26 are fitted in the depressed face. In this way, the light guide body 26 is securely positioned and light from the light guide body 26 can be reliably taken into a side of the transparent resin molded member 11.

The surface-emitting device 2 in embodiment 6 is integrally formed by the plate-shaped light guide body 26 having a side face as an incident face and an upper face as an emission face of the guided light and a light-emitting source retaining unit which is in contact with the incident face of the light guide body 26 and in which the light-emitting source 27 is embedded, the light guide body 26 and the light-emitting source retaining unit being adjacent to each other, in contact with each other, and continuous in a longitudinal direction of the rectangular plate-shaped light guide body 26 in the plan view. The light-emitting source 27 is housed in the flat cubic light-emitting source retaining unit and emits the light toward the side face of the light guide body 26 in a light-emitting direction toward the light guide body 26. The light guide body 26 is formed by a narrow and long rectangular plate-shaped body and has the face close to and facing the transparent or semi-transparent resin molded member 11 as a light guide face and the side face of the cube in contact with the light-emitting source retaining unit as the incident face. The Fresnel lenses 26L are formed on the upper face of the light guide body 26 and the light guide body 26 reflects and refracts the light from the side face in contact with the light-emitting source retaining portion in its rectangular parallelepiped shape, straightens the light through the upper face where the Fresnel lenses are formed, and emits the light in the direction of the light guide face which is the upper face of the light guide body 26, i.e., toward the transparent resin molded member 11.

The support frame 3 in embodiment 6 includes an oblong and rectangular plate-shaped support structure 36 in a plan view on an upper face of which switching circuits 37 as sensor parts are disposed and the wiring hole which is formed near one end of the support structure 36 and through which various wires are inserted. The extension wires 24 of the light-emitting source 27 supported at a predetermined height are inserted through the wiring hole and connected to a switch circuit and a power supply provided in an automobile main body or the support structure 36. To put it concretely, the support structure 36 is formed by a base plate which serves as a support base of the surface-emitting device 2, a first support frame 351 and a second support frame 352 respectively standing from a position close to one end of the base plate and a position close to the other end, and switching circuits 37 formed on a face of the base plate.

The first support frame 351 and the second support frame 352 support the light guide body 26 and the light-emitting source 27 at the same height from the base plate on tip portions of the respective support frames. The first support frame 351 supports a housing unit of the light-emitting source 27 on its upper face and has an insertion hole, through which the extension wires 24 of the light-emitting source 27 are inserted, inside itself along a height direction.

FIG. 9h is a partially-cutaway exploded perspective view showing the structure of the vehicle functional component in embodiment 6 and FIG. 10 is a partially-cutaway perspective view showing the structure of the vehicle functional component in embodiment 6. The automobile functional component in embodiment 6 as a whole forms the door handle shown in FIG. 12. When the switching circuits 37 carry out switching operation of unlocking or locking by means of electric contact of an operator with the door handle or an electromagnetic signal by an electronic key, the light-emitting source 27 emits the light through an electric signal to the extension wires 24 and the guided and transmitted light is emitted in the notched window frame area on a handle surface.

Embodiment 7

FIG. 11 is a partially-cutaway perspective view showing a structure of a vehicle functional component in embodiment 7 of the invention. In embodiment 7, Fresnel lenses 11L are formed on a depressed face on a back face of a transparent resin molded member 11 and the transparent resin molded member 11 emits light over an entire notched window portion on an upper face while straightening the light from a light guide face 26U of a light guide body 26. Other basic structures and usages are similar to those in embodiment 6.

Other Embodiments

FIG. 12 shows examples of mounted states of vehicle functional components in embodiment 8 of the invention to an automobile door handle 1H, a side pillar 1P, and a body side molding 1M. FIG. 12 shows, as an example of application to the side pillar, an example in which a locked state display window 11A for displaying letters indicating a locked state and an unlocked state display window 11B for displaying letters indicating an unlocked state are mounted as transparent resin molded members 11 into a molded cover 1. A light guide body is disposed on a back side of the resin molded member 11 of the locked state display window 11A and a locked-time light-emitting source 27A is provided beside the light guide body. A light guide body is disposed on a back side of the resin molded member 11 of the unlocked state display window 11B for displaying the letters indicating the unlocked state and an unlocked-time light-emitting source 27B is provided beside the light guide body.

FIGS. 13(a) and 13(b) show examples of mounted states of vehicle functional components in embodiment 9 of the invention to a front grille 1GL and an emblem 1E. In a sectional view in FIG. 13(b), a central portion of each grille bar of the front grille is molded into a notched window shape, a transparent resin molded member 11 is fitted into the notched window portion, and a light guide body 26 is fitted immediately behind the resin molded member 11 while sandwiched between upper and lower protruding ribs 11B of the transparent resin molded member 11. In the emblem, a portion around an emblem molded portion E and inside a frame is formed as a transparent window and a surface-emitting device having surface light-emitting sources arranged in vertical and horizontal directions is mounted into a back side of the portion.

FIG. 14 shows examples of mounted states of vehicle functional components in embodiment 10 of the invention to a rear garnish 1GN, a plate frame 1PF, and an emblem 1E. However, these are merely examples of application of the invention and all the vehicle functional components are not necessarily mounted but a part thereof may be mounted. Portions for emitting the light and timing of the light emission are adjusted properly according to a shape of the vehicle functional component.

The invention is not limited to the above-described embodiments and can be changed in various ways without departing from the gist of the invention. For example, it is possible to combine various techniques, e.g., combination of partial structures of the respective embodiments, selection of the light-emitting areas or change in the form of the light emission, omission of the light transmissive film 4 or change in whether or not the light transmissive film 4 is disposed, change in whether or not the functional component is housed, change in the masking method, change in a shape of the molded cover 1, and change in material of the support frame 3 or solid decorative molding of the support frame 3 itself.

For example, the support frame 3 forms one of the automobile door handle, the side pillar, and the body side molding while covered with the molded cover 1. In this case, the sensor part senses the opening/closing operational signal of the automobile door key based on conductive contact with the molded cover 1 or the support frame 3. The support frame 3 forms one of the automobile door mirror, the rear garnish, and the indicator light cover while covered with the molded cover 1. In this case, the sensor part senses the operational signal of opening/closing operation of the automobile door from the user or the operational signal of operation of the turn signal from the user. In the vehicle functional component in any of the above-described embodiments, the molded cover 1 is vacuum formed by molding the entire surface of the partially colored transparent or colorless transparent resin molded member by solid decorative molding by using the translucent film. Preferably, the surface-emitting device 2 is disposed on the back side of the colored transparent or colorless transparent portion of the resin molded member, the remaining portion of the resin molded member excluding the colored transparent or colorless transparent molded face is formed to be non-translucent, and the non-translucent structure restricts the light-emitting area of the surface-emitting device 2.

Moreover, the masking member 5 from which the shape of the light-emitting area is cut out may be brought into contact with the back face of the molded cover 1. It is also possible that the transparent or semi-transparent resin molded member 11, formed into the shape of the light-emitting area, may be formed by embedding/integrating molding into the cutout portion of the opaque resin molded member 1 from which the shape of the light-emitting area is cut out.

EXPLANATION OF REFERENCE NUMERALS 1 molded cover
1F decorative film
10 opaque resin molded member
11 transparent or semi-transparent resin molded member
2 surface-emitting device
21 board
22 surface light-emitting source
22A first surface light-emitting source
22B second surface light-emitting source
22C lens cover
23 board wire
24 extension wire
26 light guide body
27 light-emitting source
3 support frame
3L frame side plate
31 stay
32 housing space
33 wiring hole
36 support structure
4 light transmissive film
5 masking member
5K door key (cylinder head)
DS contact switch
L transmissive light-emitting portion, reflective light-emitting portion

The invention claimed is:

1. A vehicle component comprising:
a molded cover molded into a shape of a surface of a part attached to a vehicle; and a surface-emitting device bonded or fitted and fixed along a back face of the molded cover;
wherein the molded cover is vacuum formed by solid decorative molding of an entire surface of a translucent resin molded member with a translucent film, the translucent resin molded member comprising a partially colored transparent or colorless transparent resin molded member;
light from the surface-emitting device is transmitted through the molded cover and emerges in a predetermined light-emitting area which is a part of a surface of the vehicle component; and
a masking member from which a shape of the light-emitting area is cut out is brought into contact with the back face of the molded cover.

2. The vehicle component according to claim 1, wherein the molded cover is provided to cover a surface of a support frame mounted to a vehicle main body and the surface-emitting device is supported at an end portion of the surface-emitting device on a stay formed in a position close to one end of an inside of the support frame and fixed into the support frame while kept at a distance from the molded cover.

3. The vehicle component according to claim 1, wherein a light transmissive film having a light diffusion effect is disposed between a back face side of the molded cover and a surface side of the surface-emitting device and the light from the surface-emitting device passes through the light transmissive film and shines on a surface side of the molded cover in a diffused state.

4. The vehicle component according to claim 1, wherein the surface-emitting device includes a sheet-shaped board, a plurality of surface light-emitting sources arranged on a surface side of the board, a board wire installed on the board across between the respective surface light-emitting sources, and an extension wire electrically connected to the board wire and extending from one end of the board,
the support frame includes a housing space for housing the board and a wiring hole which is formed close to one end of the housing space and through which various wires are inserted, and
the extension wire of the board housed in the housing space is inserted through the wiring hole and connected to a switch circuit and a power supply provided in the vehicle main body or the housing space.

5. The vehicle component according to claim 4, wherein the housing space in the support frame houses a sensor part for sensing a predetermined operational signal from a user together with the surface-emitting device and the switch circuit carries out switching operation in synchronization with the predetermined operational signal sensed by the sensor part to blink or light the surface-emitting device.

6. The vehicle component according to claim 5, wherein the support frame forms one of an automobile door handle, a mounting frame for a door handle, a side pillar, and a body side molding while covered with the molded cover, and
the sensor part senses an opening/closing operational signal of an automobile door key based on conductive contact with the molded cover or the support frame.

7. The vehicle component according to claim 5, wherein the support frame forms one of an automobile door mirror, a rear garnish, and an indicator light cover while covered with the molded cover, and
the sensor part senses an opening/closing operational signal of an automobile door from the user or an operational signal of a turn signal from the user.

8. The vehicle component according to claim 1, wherein the surface-emitting device includes a plate-shaped light guide body, a light-emitting source disposed on a side face side of the light guide body to incident into the light guide body, and an extension wire electrically connected to the light-emitting source and extending from a side portion of the light guide body,
a light guide face made of Fresnel lenses is formed on an upper face of the plate-shaped light guide body,
the support frame includes a support structure capable of supporting the light guide body and the light-emitting source respectively at predetermined heights and a wiring hole which is formed near one end of the support structure and through which various wires are inserted,
the extension wire of the light-emitting source supported at the predetermined height is inserted through the wiring hole and connected to a switch circuit and a power supply provided in the vehicle main body or the support structure.

9. The vehicle component according to claim 8, wherein the support structure of the support frame supports a sensor part for sensing a predetermined operational signal from a user together with the surface-emitting device and the switch circuit carries out switching operation in synchronization with the predetermined operational signal sensed by the sensor part to blink or light the surface-emitting device.

10. The vehicle component according to claim 1, wherein the surface-emitting device is disposed on a back side of the colored transparent or colorless transparent portion of the resin molded member, a remaining portion of the resin molded member excluding the colored transparent or colorless transparent molded face is formed to be non-translucent, and the non-translucent structure restricts the light-emitting area of the surface-emitting device.

11. The vehicle functional component according to claim 1, wherein a masking member from which a shape of the light-emitting area is cut out is brought into contact with the back face of the molded cover.

12. The vehicle component according to claim 1, wherein the resin molded member, being transparent or semi-transparent and formed into a shape of the light-emitting area, is formed by embedding/integrating molding into the cutout portion of the resin molded member being opaque from which the shape of the light-emitting area is cut out.

* * * * *